HIGH-SPEED FACSIMILE SYNCHRONIZING SYSTEM

Filed Sept. 28, 1945

INVENTOR.
WILLIAM G.H. FINCH
BY
Ostrolenk and Faber
ATTORNEYS

Patented Nov. 21, 1950

2,530,516

UNITED STATES PATENT OFFICE 2,530,516

HIGH-SPEED FACSIMILE SYNCHRONIZING SYSTEM

William G. H. Finch, Newtown, Conn.

Application September 28, 1945, Serial No. 619,169

6 Claims. (Cl. 178—69.5)

My present invention relates to facsimile systems, and more particularly to synchronizing means therefor operable to maintain perfect synchronism between the transmitter and receiver while pictures are being sent at high speed.

Heretofore, in the transmission and reception of facsimiles, it has been necessary, where absolute synchronism was desired between the transmitting and receiving apparatus, to transmit the facsimiles at a relatively slow speed. This relatively slow speed of about one hundred lines per minute has nevertheless been regarded as a rather high speed. For instance, where a drum was ten inches wide and one hundred lines per inch was transmitted, then at this speed a picture ten inches long and having a width only slightly less than the circumference of the drum, was transmitted in ten minutes or less. Modern developments have made it possible, however, to transmit facsimiles by photo-recording or chemical recording processes at a much higher speed. Thus, for instance, it has been found that without any attempt to maintain synchronism, speeds as high as four hundred lines per minute became feasible, and thus the ten-inch picture above described could be transmitted in two and one-half minutes.

Heretofore, synchronizing systems have consisted essentially of stop-start mechanisms of the type specifically described in my prior Patent No. 2,108,983. The receiving drum was rotated at a slightly greater speed than the transmitter, say, in a ratio of 101:100, so that the receiving drum would reach the synchronizing area first. The receiving drum was then brought to a stop or its rate of speed adjusted practically to zero for an extremely short interval pending the receipt of a synchronizing signal which would permit the receiving drum to start once more. The arrangement of the mechanical elements as well as of the electrical elements used for synchronizing was such that at one hundred lines per minute, the receiving drum could readily be brought to a stop and started once more at a rate approaching twice per second.

Where higher speeds were attempted, the stop-start method could be adapted by various adjustments to work properly at a scanning rate of one hundred twenty lines per minute (exactly two stop-start operations in each second), and even slightly higher, but at speeds of four hundred lines per minute the stop-start mechanism created too much vibration, thus interfering with the quality of the image being recorded, and at times causing the synchronizing impulse to be skipped entirely, due to the vibration introduced.

Essentially my invention contemplates means for detecting variations in the speed of the receiver with respect to the transmitter, and automatically correcting for these variations in speed. The transmitter is so arranged that it will transmit at the synchronizing interval a pair of spaced signals which will each make a black mark on the recorded image spaced by a relatively narrow white band. A photo-cell at the receiver focused at the particular scanning line and movable as the scanning progresses, is so arranged that it is energized between the two successive synchronizing signals which make the black marks. If the photo-cell receives a full reflection of light, indicating that the space between the two signals is completely unmarked, then no operation is performed to correct the receiver, since the receiver is rotating at proper speed. If one of the black marks is, however, moved into the white area at the time of the receipt of the synchronizing signal, then the photo-cell at that instant will detect the presence of the black mark and will slow up the receiver slightly to correct the phasing thereof with respect to the transmitter. This correction will be to a degree which is related to the extent of the black mark into the space which should remain unmarked.

Similarly, if the other black mark projects into the space which should remain unmarked at the time of the receipt of the synchronizing signal, then the photo-cell will act to speed up the receiver by the amount corresponding to the extent of the black mark into the white space.

Accordingly, my novel synchronizing system does not depend on any stop-start operation, and in fact, does not operate at all on the receiver if the receiver is in perfect synchronism. It is brought into operation the moment the receiver begins to go out of synchronism, and depending on the sense in which the receiver is out of synchronism, it will speed up the receiver, or slow it down, so that it will be in proper phase relationship to the transmitter. Since prior-art, start-stop systems are thereby completely avoided, high-spaced facsimile transmission is made possible, and speed ranges of 400 R. P. M. or even higher become entirely feasible.

A primary object of my invention is the provision of a novel synchronizing method and means for high-speed facsimile transmission.

Another object of my invention is the provision of synchronizing means for phase correction of the receiver with respect to the transmitter, when the receiver begins to go out of synchronism with the transmitter, said synchronizing means remaining inoperative as long as the receiver is in proper phase relationship during the synchronizing interval, with the transmitter.

A further object of my invention is the utilization of a guide mark on received record for operating synchronizing elements of the receiver.

These and many other objects of my invention will become apparent in the following description and accompanying drawing, in which.

Figures 1, 2, 3, 4:
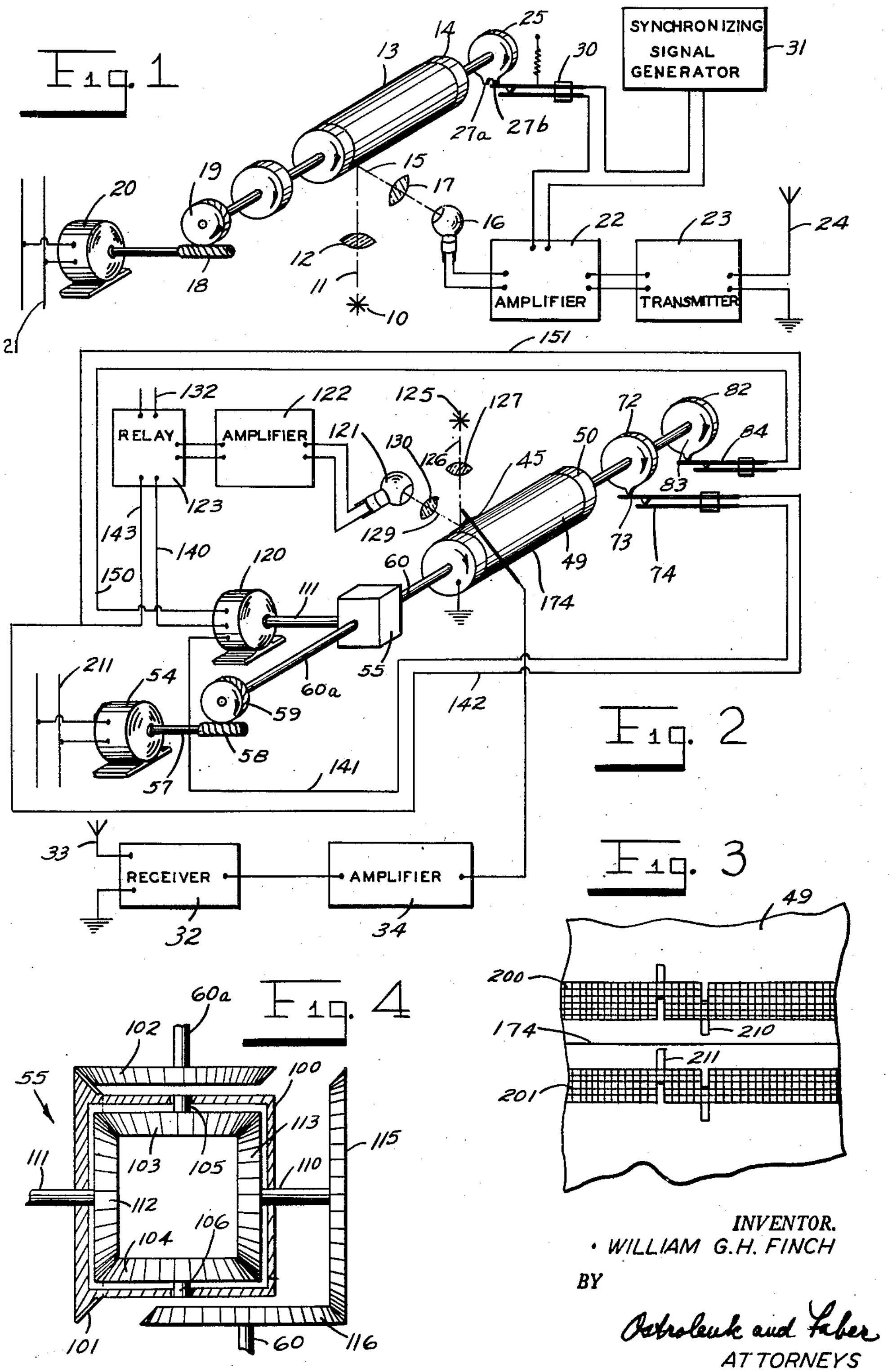
Figure 1 is a schematic view showing the transmitter.
Figure 2 is a schematic view showing my novel receiver and its associated synchronizing elements.
Figure 3 is a plan view of a portion of the record sheet on the drum of the receiver.
Figure 4 is a schematic view of the differential mechanism which forms a portion of the synchronizing apparatus at the receiver.

The schematic diagrams Figures 1 and 2, of a telepicture transmitter and receiver, respectively, are described to more clearly set forth the function and relation of the synchronizing mechanism of my present invention. It is to be understood that the telepicture system and circuits described are by way of example only and that the synchronizing mechanism to be hereinafter described in detail is applicable to other telepicture or facsimile systems.

Referring to Figure 1, a source of light 10 generates a beam 11 focused to a point by a lens system 12 upon the picture 13 to be transmitted, which is mounted on the cylindrical drum 14. If the picture is scanned one hundred lines per inch, the diameter of the light spot focused upon the picture 13 should be .01 inch. The refracted beam 15 from the picture is focused upon the photoelectric cell 16 by lens system 17. The intensity of the refracted beam 15 is proportional to the shading of the picture elements which are successively moved past the light beam 11.

The picture drum 14 is rotated by worm 18 and worm gear 19 which suitably reduce the speed of the motor 20. Motor 20 is preferably a synchronous motor connected to a commercial electrical supply line 21, for example, a sixty-cycle, 110-volt system. Drum 14 may be driven at a normal speed of 400 revolutions per minute which, with four hundred lines scanned per inch, results in one inch of the picture traversed per minute.

The refracted picture light beam 15 impinging on photoelectric cell 16 produces corresponding electrical signals which are amplified by amplifier 22. A light "chopper" or an audio frequency carrier wave may be employed with the amplifier 22 to facilitate transmission of the varying unidirectional picture signals as is well known in the art.

The telepicture signals may be directly transmitted to a remote station over wire lines, or may be transmitted by radio transmission means. Figure 1 illustrates a transmitter 23 connected to the output of amplifier 22 for converting the audio frequency telepicture signals into corresponding radio frequency signals which are radiated by antenna 24.

Synchronizing signals are cyclically transmitted for effecting synchronization of the transmitter scanning apparatus in a manner to be described in detail. The synchronizing signals are preferably transmitted once per scanning operation. When a drum is used as in the preferred embodiment, the "underlap" portion of the rotation cycle is employed to transmit the synchronizing signal. The underlap period corresponds to the portion of the picture drum where the opposite ends of the picture 13 are gripped or otherwise fastened into position on the drum. In a continuous sheet system, the synchronizing signal is transmitted during the return oscillation movement, marking the beginning and end of each scanning line excursion. The transmission of a synchronizing signal for a continuous sheet system is described in my Reissue Patent No. 19,575.

A cam 25 is mounted on shaft 26 of the telepicture drum 14. A pair of projections 27*a* and 27*b* are positioned angularly, corresponding to the underlap portion of the drum 14. The edge 28 of the picture sheet 13 determines one side of the underlap zone and is gripped by clamping means internal to the drum 14 in a manner preferably as described in my prior Patent No. 2,051,511.

The synchronizing cam switch 30 is cyclically closed by the cam projections 27*a* and 27*b* to impress suitable synchronizing impulses upon the amplifier 22 from the synchronizing signal generator 31. The projections 27*a* and 27*b* are designed so that the underlap portion of drum 14 will send three effective signals which can be used operatively at the receiver to synchronize the receiving drum. The first signal sent by the closing of synchronizing switch 30 by the projection 27*a*, will record a black mark on the receiver recording paper in a manner hereinafter described. After projection 27*a* passes the cam switch 30, the cam switch will open, and no mark at all will be recorded on the receiver record paper. Immediately thereafter, projection 27*b* will close the cam switch 30, thus effecting the recording of a black mark once more on the receiver record sheet 49. This may be readily seen in Figure 3.

Synchronizing switch 30 is connected in series with the synchronizing signal generator 31 output to a suitable portion of the telepicture amplifier 22 schematically indicated in Figure 1. The synchronizing impulse effective during the underlap period is preferably of intensity somewhat greater than the maximum or "white" telepicture signal intensity in order to readily distinguish the synchronizing signals from the telepicture signals at the receiver.

The synchronizing generator 31 may be a direct current source which produces a unidirectional impulse at each closure of cam switch 30, or may be an audio carrier frequency signal which is unmodulated during the synchronizing period and is suitably modulated by the picture signals during the remaining period of the cycle. A preferred embodiment of such a method for signal generation forms the basis of my prior Patent No. 2,069,061.

The synchronizing signal which is sent in this manner, occurs during the underlap period of the picture transmitter, and is preferably of greater magnitude than the telepicture signals. Although I prefer to use synchronizing signals of increased intensity, actually my novel synchronizing system herein disclosed will operate successfully with signals of intensity equal to the maximum intensity picture signals, since all that is required is that a black mark be made at the receiver on receipt of the synchronizing signal.

Since all that is required is the making of a black mark, it is obvious that the clamping plate for the transmitter record 13 on the transmitter drum 14 may simply have a pair of longitudinal black marks thereon spaced as shown at the receiver recording of Figure 3, to transmit such black lines to the receiver record. The use of a synchronizing signal generator 31 makes it unnecessary, however, to place the black lines on the clamp, and also makes it unnecessary to ensure that the white area and the black areas on the clamp are always clean, i. e., if such black lines with a white line between them were depended upon at the clamp, it would be necessary to service the transmitter frequently to ensure that the white line was not fogged or clouded by dust, and that the black lines were not rendered reflective by dust particles adhering thereto.

The receiving apparatus shown in Figure 2 comprises a receiver 32 which receives and detects the signals received by antenna 33 from the transmitter antenna 24, and passes them through an appropriate amplifier 34 to the recording stylus 45. The recording stylus 45 marks the record sheet 49 on the receiving drum 50 in a manner which is now well known in the art, and which is shown more specifically in my prior Patent No. 2,047,263.

The drum 50 is driven from the motor 54 which is supplied from the power line 21', which is a sixty-cycle, 110-volt line having characteristics corresponding as far as possible to the line supplying the transmitter motor. The synchronism between the receiver and transmitter depends on obtaining an initial approximate synchronism between the motors driving the receiver and transmitter apparatus. This approximate synchronization can be obtained to a very close degree, and the synchronizing apparatus herein described is for the purpose of correcting any shift in phase between the receiver and transmitter drums that may occur due to slight variations in the motor speeds at the transmitter and receiver.

The receiver drum is driven from motor 54 by worm 58 on shaft 57 of motor 54 which drives worm gear 59 mounted on a shaft 60*a*. Shaft 60*a* drives the drum shaft 60 through the differential gear arrangement 55 shown more clearly in Figure 4. The differential gear arrangement 55 comprises a housing 100 carrying the bevel gear 101. Shaft 60*a* has bevel gear 102 meshing with bevel gear 101 and driving the housing 100. The sides of housing 100 have bevel gears 103 and 104 rotatably mounted on shafts 105 and 106, respectively. The ends of the housing 100 are provided with shafts 110 and 111 around which the housing rotates. Shaft 111 is provided with a bevel gear 112 engaging with bevel gears 103 and 104 on one side. Shaft 110 is provided with a bevel gear 113 engaging bevel gears 103, 104 on the opposite side. Shaft 110 drives bevel gear 115, which in turn drives bevel gear 116 on shaft 60. Ordinarily, the bevel gear 112 and shaft 111 are stationary, so that rotation of shaft 60*a* is directly translated into rotation of the housing 100 and of the bevel gear 113, and thus into rotation of shaft 110 and bevel gear 115, thereby causing shaft 60 to rotate in accordance with shaft 60*a*.

In accordance with usual operations of differential mechanisms, if shaft 111 is rotated in one direction, rotating bevel gear 112 in that direction, then gears 103 and 104 will be correspondingly rotated to effect a change in the net speed of rotation of gear 113 in one sense (for instance, to slow it down); while rotation of gear 112 and shaft 111 in the opposite direction during the rotation of shaft 60*a* will effect a speeding up of shaft 110 and shaft 60. Shaft 111 is connected to a relatively light reversing motor 120 which is operated in response to energization of the photocell 121 through amplifier 122 and relay 123. The shaft 60 of drum 50 is provided with cams 72 and 83 having, respectively, projections 73 and 83 operating respectively the cam switches 74 and 84. The angular position of projection 73 of cam 72 should correspond to the angular position of projection 27*a* of cam 25 in Figure 1. The angular position of projection 83 of cam 82 should correspond to the angular position of projection 27*b* of cam 25 of Figure 1; and the angular spacing between the projection 73 and projection 83 of Figure 2 should correspond to the angular spacing between projections 27*a* and 27*b* of Figure 1.

When the receiver drum 50 is rotating in absolute synchronism with the drum 14 of the transmitter, projection 73 of the receiver will close the cam switch 74 at the instant that projection 27*a* of the transmitter closes the cam switch 30 thereof, and projection 83 of the receiver closes the cam switch 84 at exactly the instant that projection 27*b* of the transmitter closes the cam switch 30. Both of the cam switches 74 and 84 will be open at the space between projections 73 and 83, corresponding exactly to the opening of cam switch 30 at the space between the projections 27*a* and 27*b*. When this condition occurs, with the switches operating exactly simultaneously at both the receiver and transmitter, then no correction of the receiver is required, and no correction will be made by my apparatus.

When, however, the switch 74 is closed by cam projection 73 at a time interval which does not correspond exactly to the closing of switch 30 by cam projection 27*a*, then the motor 120 will be operated momentarily to change the speed of rotation of drum 50. If the cam switch 74 is closed before projection 27*a* closes cam switch 30, then the motor 120 will be operated to slow up the drum. If projection 83 closes the cam switch 84 after projection 27*b* of the transmitter has closed the cam switch 30, then motor 120 will be operated to speed up the drum 50. The operation depends upon the recording of the synchronizing signal on the receiver record sheet 49 at the area of underlap 174.

The area of underlap 174 is the area at which the ends of the paper meet and are clamped or otherwise held. During normal operation, with all of the parts moving constantly in synchronism, cam switch 74 will be closed at the same time that cam switch 30 is closed by projection 27*a*, and a black mark will be transmitted to the receiver record 49, making the mark 200 (Figure 3). A succession of such marks produces a continuous black line. After projection 27*a* has passed the transmitter cam switch 30, then if the receiver is in exact synchronism, projection 73 thereof simultaneously passes cam switch 74 and no mark will be made at the underlap area 174. The next synchronizing signal in the same cycle occurs when the projection 27*b* passes cam switch 30. If at the same time, projection 83 has passed cam shaft 84 of the receiver, then the mark 201 will be made.

A mask (not shown) is provided above the receiver drum 50 registering exactly with the area at which the stylus is making a mark. If the stylus makes no mark at the area 174, and the two synchronizing signals are received at areas 200 and 201 on either side of the area 174, then the full amount of light will be reflected to the photocell 121. Photocell 121 is provided with an independent light source 125 which directs a light beam through the lens system 127 through the mask 150 to the drum portion 49. The reflected light 129 is concentrated through the lens system 130 on the photocell 121. The light received by photocell 121 is translated into electrical impulses which are amplified by the amplifier 122 to operate the relay 123 to control the current from current source 132 to the motor 120. Relay 123 is so arranged that when energized by full current from the photocell, it will open the circuit from current source 132 to the motor 120. When the photocell is not energized, relay 123 will close the circuit from the current source 132 to the motor 120.

If a mechanical relay is used, it must be so arranged that it will respond within a period of 1/200 of a second. If such a response is difficult to obtain mechanically, appropriate electronic trigger circuits may be provided for this purpose.

The motor 120 should be a quick-acting motor that will operate instantaneously on momentary energization. Should the receiver move slightly faster than the transmitter, switch 74 will be closed by projection 73 before projection 27*a* closes its switch 30. The projection 73 is so arranged that it will maintain the cam switch 74 closed for a slightly longer angular distance than the switch 27*a*, up to the center line of the space 174 between the two black lines 200, 201. If the synchronizing signal is now received while the switch 74 is closed, it will not register exactly with the optimum line 200 as it should in Figure 3, but as shown at 210, will cause a black mark to appear in the area 174.

During the duration of this black mark in the area 174, the trigger relay 123 will be operated by the cutting off of light to the photo-cell 121 to operate the motor 120 in a direction to slow down the drum 50, and this slowing down operation will take place over the length of the projection 210 into the area 174 and thus will be in proportion to the amount by which the receiver drum 50 is speeded up. The circuit to the reversing motor 120 will be from relay 123 over conductor 140, to motor 120, then over conductor 141 to the cam switch 74, then over conductor 142 to conductor 143, back to the relay 123.

Should the drum 50 be moved slightly slower than drum 14, then no portion of mark 200 will move into the white area 174, but portion 211 of mark 201 will record in the white area 174. In this case, cam switch 84 is arranged so that it will be energized from the center of white area 174 down to the furthest margin of black area 201. If the drum 50 is moving too slowly, then cam switch 84, which is closed at the center line of white area 174, will receive the impulse from the transmitter while the stylus is still in the area 174 which remains white, thus making the mark 211. The synchronizing signal which is operated by the closing of cam switch 30 will then come in too soon at mark 211. A black mark will be made which through the photo-cell will operate the relay to close a circuit from power source 132 to conductor 140, and the circuit will be completed to the opposite or reverse set of poles of motor 120 from conductor 140, through the motor 120, over conductor 150, to cam switch 84, back through conductor 151 to conductor 143 to the relay. By this means, therefore, start-stop methods of synchronization are avoided, and any synchronizing operation is made unnecessary if the transmitter and receiver are operating in synchronism.

If the receiver should move out of synchronism with the transmitter, then the motor begins to operate through the differential gear mechanism to slow or stop the receiving drum in accordance with the degree with which it has moved out of synchronism. If the degree of asynchronism is slight, then the black mark made on the white area 174 will be relatively small, and the degree of correction will be relatively small. If the degree of asynchronization is relatively high, then the black mark will be relatively long, and the degree of correction relatively great. The degree of asynchronization possible while still maintaining the operative qualities of my novel synchronizing mechanism, is through a distance of one-half the width of the white area 174, and the width of this white area 174 is obtained by appropriate spacing of the operators for the cam switches, and thus may be substantially greater than that shown. This width may be double or more than double that of either of the black lines, so that the full value of a black line may be used in case asynchronism is to a degree equal to the width of the black line. If the asynchronism is greater than the width of a black line, then no correction can be made. Since, however, the variations which are encountered even without synchronizing apparatus are of the order of not more than five per cent between the transmitter and receiver motors, a white line over an arc of about twenty degrees will be sufficient, with black lines of ten degrees width circumferentially.

The synchronizing apparatus will phase the receiver properly at each revolution by appropriate operation of the reversing motor 120 in the appropriate direction, in accordance with the marking made in the white area 174, as long as the asynchronism is not so violent that the cyclical variation between the transmitter and receiver drums is more than twenty degrees. When synchronism is achieved between the transmitter and receiver, no adjustments need be made at all, so that my mechanism is so arranged that operations which need not be performed are avoided, and synchronizing operations are performed at the receiver only when there is a necessity therefor.

If during operation or just prior to operation of the apparatus, the particular operating motors are accurately adjusted by the sending of a few test signals, then it may not be necessary for the synchronizing apparatus to operate even once during the transmission of an entire picture, but the synchronizing apparatus is so arranged that should asynchronism occur, correction will immediately be made.

In a variation of my invention, it may be possible to utilize the energization and de-energization of the photo-cell to vary the resistance in series with a particular operating motor in order to vary its speed in accordance with the degree of asynchronism of the receiver with respect to the transmitter. Thus, where the main operating motor of the receiver moves out of synchronism with the transmitter motor, it will no longer be necessary to make a correction at every cycle, but the correction at the end of one cycle by varying the speed of rotation of the particular transmitter motor will effect a permanent change in the speed of operation of the receiver drum to the appropriate synchronous speed; and further synchronizing operations will occur only in the event the receiver drum moves out of synchronism once more.

In addition, instead of making a black mark and using a photo-cell to automatically interpret the black mark and operate the receiver adjusting means, the current of the synchronizing signal may be switched directly to the receiver adjustment means, which receiver adjustment means will include the cam switches 74 and 84 above described, and either a reversing motor or a pair of motors to be energized in opposite directions.

In the foregoing, I have described my invention only in connection with a preferred embodiment thereof. Since many variations and modifications of my invention will now be apparent to those skilled in the art, and since the foregoing is simply an illustrative embodiment of my novel synchronization principle, I prefer not to be bound by the specific disclosure herein contained, but only by the appended claims.

I claim:

1. In a facsimile system comprising a transmitter and a receiver; said transmitter including a drum for carrying a record to be transmitted and said receiver including a drum for carrying a sheet to record the image; means at the receiver for marking the record sheet; driving means at the transmitter and receiver for rotating the respective drums at approximately synchronous speed; means at the transmitter for generating a synchronizing signal; means at the receiver for receiving the synchronizing signal; said marking means at the receiver being responsive to said synchronizing signal to make a characteristic mark on the record on the receiver drum; and means including a single photoelectric cell responsive to the position of the characteristic mark on the record for increasing or decreasing the speed of the receiver drum, in accordance with its position relative to the transmitter drum for maintaining synchronism therebetween.

2. In a facsimile system comprising a transmitter and a receiver; said transmitter including a drum for carrying a record to be transmitted and said receiver including a drum for carrying a sheet to record the image; means at the receiver for marking the record sheet; driving means at the transmitter and receiver for rotating the respective drums at approximately synchronous speed; means at the transmitter for generating a synchronizing signal; means at the receiver for receiving the synchronizing signal; said marking means at the receiver being responsive to said synchronizing signal to make a characteristic mark on the record on the receiver drum; means at the transmitter for transmitting said synchronizing signal in two spaced pulses during a portion of the cycle of rotation of the drum; means at the receiver for impressing said synchronizing impulse on said record marking means; said synchronizing signal marking the record at predetermined areas when the drums are in synchronism, and marking the record outside the predetermined areas when said drums are not in synchronism.

3. In a facsimile system comprising a transmitter and a receiver; said transmitter including a drum for carrying a record to be transmitted and said receiver including a drum for carrying a sheet to record the image; means at the receiver for marking the record sheet; driving means at the transmitter and receiver for rotating the respective drums at approximately synchronous speed; means at the transmitter for generating a synchronizing signal; means at the receiver for receiving the synchronizing signal; said marking means at the receiver being responsive to said synchronizing signal to make a characteristic mark on the record on the receiver drum; means at the transmitter for transmitting said synchronizing signal in two spaced pulses during a portion of the cycle of rotation of the drum; means at the receiver for impressing said synchronizing impulse on said record marking means; said synchronizing signal marking the record at predetermined areas when the drums are in synchronism, and marking the record outside the predetermined areas when said drums are not in synchronism; and a single photoelectric cell means responsive to markings on the record outside the predetermined areas for adjusting the speed of the receiver drum in accordance with the degree and sense of asynchronism of the drums.

4. In a facsimile system comprising a transmitter and a receiver; said transmitter including a drum for carrying a record to be transmitted and said receiver including a drum for carrying a sheet to record the image; means at the receiver for marking the record sheet; driving means at the transmitter and receiver for rotating the respective drums at approximately synchronous speed; means at the transmitter for generating a synchronizing signal; means at the receiver for receiving the synchronizing signal; said marking means at the receiver being responsive to said synchronizing signal to make a characteristic mark on the record on the receiver drum; means at the transmitter for transmitting said synchronizing signal in two spaced pulses during a portion of the cycle of rotation of the drum; means at the receiver for impressing said synchronizing impulse on said record marking means; said synchronizing signal marking the record at predetermined areas when the drums are in synchronism, and marking the record outside the predetermined areas when said drums are not in synchronism; means responsive to markings on the record outside the predetermined areas for adjusting the speed of the receiver drum in accordance with the degree and sense of asynchronism of the drums; said means comprising photo-responsive means scanning said receiver drum, and a member controllable thereby connected to said drum.

5. In a facsimile system comprising a transmitter and a receiver; said transmitter including a drum for carrying a record to be transmitted and said receiver including a drum for carrying a sheet to record the image; means at the receiver for marking the record sheet; driving means at the transmitter and receiver for rotating the respective drums at approximately synchronous speed; means at the transmitter for generating a synchronizing signal; means at the receiver for receiving the synchronizing signal; said marking means at the receiver being responsive to said synchronizing signal to make a characteristic mark on the record on the receiver drum; means at the transmitter for transmitting said synchronizing signal in two spaced pulses during a portion of the cycle of rotation of the drum; means at the receiver for impressing said synchronizing impulse on said record marking means; said synchronizing signal marking the record at predetermined areas when the drums are in synchronism, and marking the record outside the predetermined areas when said drums are not in synchronism; means responsive to markings on the record outside the predetermined areas for adjusting the speed of the receiver drum in accordance with the degree and sense of asynchronism of the drums; said means comprising photo-responsive means scanning said receiver drum, and a member controllable thereby connected to said drum; said member comprising a reversing motor, a clutch connection between the main drive for said drum and said drum, and a differential gear between said reversing motor and said drum.

6. In a facsimile system comprising a transmitter and a receiver; said transmitter including a drum for carrying a record to be transmitted and said receiver including a drum for carrying a sheet to record the image; means at the receiver for marking the record sheet; driving means at the transmitter and receiver for rotating the respective drums at approximately synchronous speed; means at the transmitter for generating a synchronizing signal; means at the receiver for receiving the synchronizing signal; said marking means at the receiver being responsive to said synchronizing signal to make a characteristic mark on the record on the receiver drum; means at the transmitter for transmitting said synchronizing signal in two spaced pulses during a portion of the cycle of rotation of the drum; means at the receiver for impressing said synchronizing impulse on said record marking means; said synchronizing signal marking the record at predetermined areas when the drums are in synchronism, and marking the record outside the predetermined areas when said drums are not in synchronism; means responsive to markings on the record outside the predetermined areas for adjusting the speed of the receiver drum in accordance with the degree and sense of asynchronism of the drums; said means comprising photo-responsive means scanning said receiver drum, and a member controllable thereby connected to said drum; said member comprising a reversing motor, a clutch connection between the main drive for said drum and said drum, and a differential gear between said reversing motor and said drum; a pair of switches at the receiver successively operable in approximate synchronism with the synchronizing impulses; one of said switches closing a circuit through the photo-responsive means and the reversing motor for operating the reversing motor in one direction, the other of the switches closing a circuit through the photo-responsive means and the reversing motor for operating the reversing motor in opposite direction.

WILLIAM G. H. FINCH.

REFERENCES CITED

The following references are of record in the file of this patent:

UNITED STATES PATENTS

| Number | Name | Date |
|---|---|---|
| 1,660,711 | Jenkins | Feb. 28, 1928 |
| 1,723,641 | Abild | Aug. 6, 1929 |
| 1,739,949 | Cooley | Dec. 17, 1929 |
| 2,150,239 | Nichols | Mar. 14, 1939 |
| 2,230,822 | Artzt | Feb. 4, 1941 |
| 2,246,284 | Artzt | June 17, 1941 |
| 2,329,077 | Nichols | Sept. 7, 1943 |